Dec. 23, 1952 M. FASSBERG 2,623,106
METHOD AND APPARATUS FOR MEASURING THE
TIME RISE AND DECAY TIME OF PULSES
Filed Dec. 29, 1948 2 SHEETS—SHEET 1

INVENTOR.
Morton Fassberg
BY
ATTORNEY.

Dec. 23, 1952  M. FASSBERG  2,623,106
METHOD AND APPARATUS FOR MEASURING THE
TIME RISE AND DECAY TIME OF PULSES
Filed Dec. 29, 1948  2 SHEETS—SHEET 2
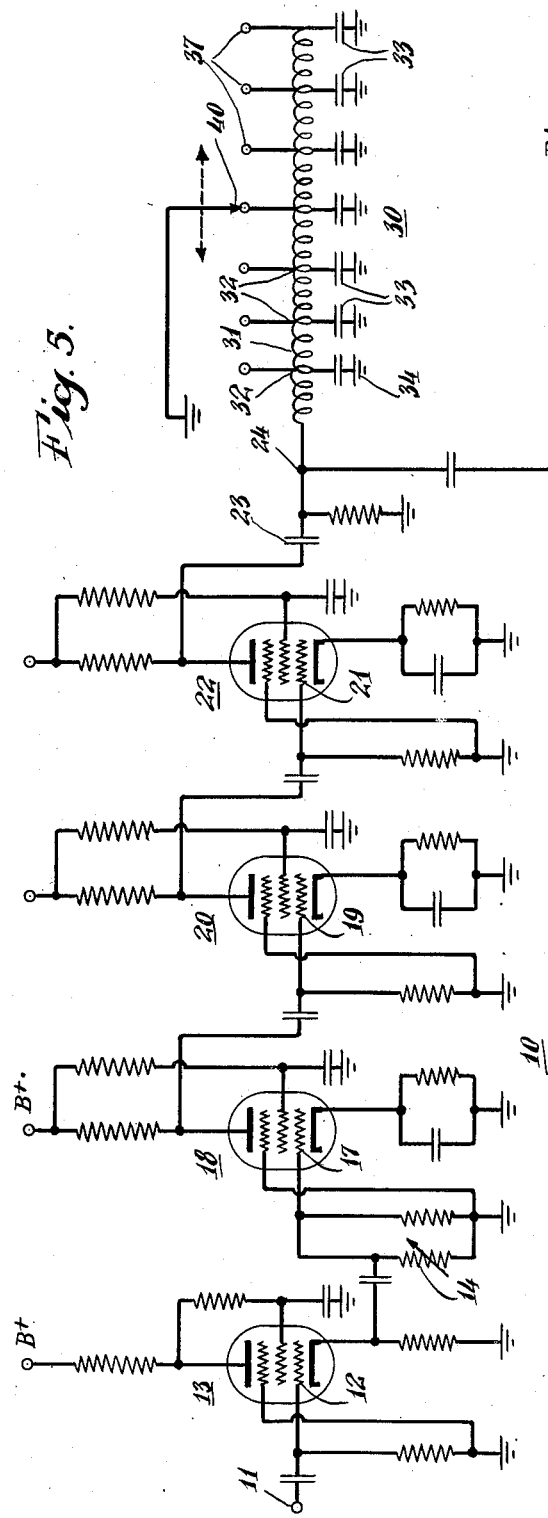
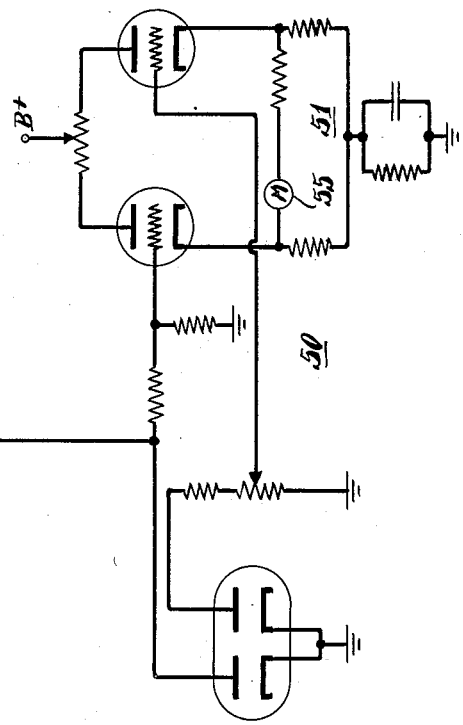
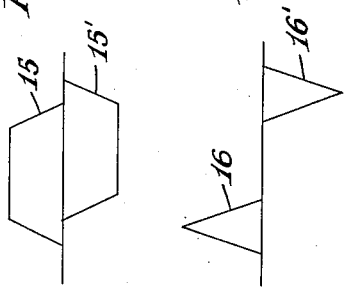
INVENTOR.
Morton Fassberg
BY
ATTORNEY.

Patented Dec. 23, 1952

2,623,106

UNITED STATES PATENT OFFICE 2,623,106

METHOD AND APPARATUS FOR MEASURING THE TIME RISE AND DECAY TIME OF PULSES

Morton Fassberg, New York, N. Y.

Application December 29, 1948, Serial No. 67,882

15 Claims. (Cl. 175—381)

1

This invention relates to electronic mensuration and, more particularly, to a simple method and apparatus for measuring the time rise of pulses, such as substantially trapeziodally shaped pulses.

Knowledge of the time rise and decay time of a pulse is an important factor in the design of pulse transmission networks and in the operation of various types of electronic trigger circuits. This is due to the fact that the rise time of a pulse is a determinant of the frequency spectrum associated with the pulse. For example, it has been demonstrated that, if a perfectly sharp pulse is passed through an ideal low-pass filter having a cut-off frequency $f_c$, the output of the filter will be a pulse having a finite rise time $t$ whose value is given by the following expression:

$$t = \frac{1}{2f_c}$$

It follows that a pulse having a rise time $t$ can be said to have associated therewith a frequency spectrum $f_c$ given by the following expression:

$$f_c = \frac{1}{2t}$$

Thus, the rise time or conversely the decay time of a pulse may be used to determine the frequency band necessary to transmit the pulse.

Various schemes have been proposed for measuring the rise time of a pulse but have been unduly complicated in operation, have required extensive calculations or have been difficult and very expensive to design and construct. For example, an oscilloscope may be used to measure rise time by viewing the pulse, although such operation requires extensive measurements and computations requiring considerable time.

When the pulse has a very sharp rise time, of the order of 0.1 microsecond, then, in order to obtain a faithful representation of the wave shape, the oscilloscope must have a band width of about 10 megacycles. In particular, the vertical amplifier of the oscilloscope must have a band width of this order. It is a far more difficult task to provide an oscilloscope with a vertical amplifier having such a band width than it is to provide other electronic means, such as a video amplifier (as used with the present invention) having such a band width. This is due to the necessity of providing a much higher gain for the oscilloscope amplifier. While oscilloscopes having such a wide band width have been built, their cost has been very excessive, particularly as compared to the cost of the present invention.

2

Having the foregoing defects and limitations of the prior art in mind, the present invention provides a simple, inexpensive and reliable apparatus for measuring the time rise of pulses, in which the time rise can be determined directly and without resort to extensive and complicated computations. In its broadest aspects, the present invention involves the impressing of a train of pulses, whose rise time is to be measured, onto a short-circuited time delay or reflector line having a variable length and a variable calibrated time delay which is a function of the length of the line.

The action of this line is to convert each incident pulse into two pulses of opposite polarity. If the total time delay of the line is less than the rise time of the incident pulse, the resultant two pulses will have an amplitude smaller than that of the incident pulse. On the other hand, if the total time delay of the line is greater than the rise time of the incident pulse, the amplitude of the two pulses will be the same as that of the incident pulse. Thus, as the calibrated time delay of the line is varied or adjusted from a smaller to a larger value, the amplitude of the two pulses is correspondingly varied. When this amplitude, which is measured by suitable means, reaches its maximum, substantially constant value, the total time delay of the line is equal to the rise time of the incident pulse. Since the calibrated time delay of the line is known, the rise time of the incident pulse is also known and its measurement has been effected.

The shape of the rising part of the incident pulse can be determined by varying the time delay of the line and plotting the amplitude of one of the resultant pulses as a function of the calibrated time delay values. The question of which one of the two pulses to be used depends upon the relative polarity of the incident pulse. If the latter is positive, the positive one of the resultant pulses is used, and vice versa.

More specifically, the invention apparatus includes a video amplifier having a wide frequency response and capable of substantial amplification of an incoming train of pulses without changing the characteristic shape of the pulses. The short circuited delay line is connected to the output of the amplifier, and is a uniformly wound coil tapped at equidistant points which are tied to condensers grounded at their low ends. The delay line is essentially a low pass filter and has propagating characteristics similar to those of an artificial transmission line. The length of the line can be varied by grounding means adjustable along the equidistant taps, and the time delay of the line is calibrated as a function of its length. To measure the amplitude of the resultant pulses, a vacuum tube voltmeter, capable of indicating the peak of a voltage wave, is preferably used, although standard voltmeters capable of measuring the peak voltage may be used.

It is, accordingly among the objects of this invention to provide a method and means for measuring the time rise of substantially trapezoidally shaped pulses.

Another object is to provide means for determining the shape of the rising part of a pulse by simple operations.

A further object is to provide such a method which is simple to practice and reliable.

Still another object is to provide pulse time rise measuring apparatus which is simple, inexpensive, reliable and capable of operation over a wide band of frequencies.

These, and other objects, advantages and novel features of the invention will be apparent from the following description and the accompanying drawings. In the drawings:

Fig. 1 is a block diagram of the essential units of the apparatus, showing the pulse shapes at the various junction points.

Fig. 2 schematically illustrates the incident and reflected pulses appearing on the delay line when the time delay of the latter is greater than the pulse rise time.

Fig. 5 is a schematic wiring diagram of the units of the invention.

Figure 6 is a view similar to Figures 2 and 3, showing conditions when the time delay of the line is equal to the pulse rise time.

Figure 6A shows the two resultant pulses from the combination of the pulses of Figure 6.

Figure 1:
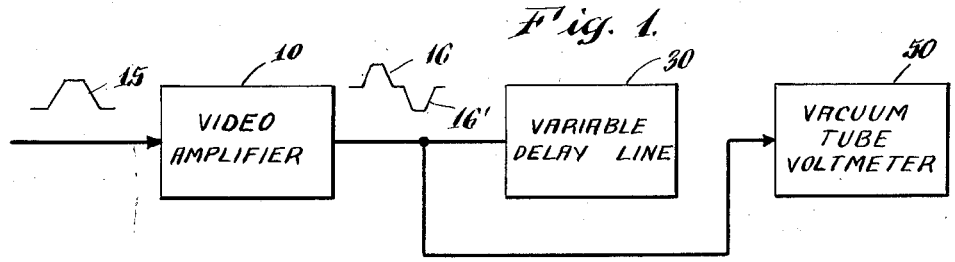

Referring to Fig. 1, the invention apparatus includes a video amplifier 10 capable of amplifying a train of pulses, similar to pulse 15, without change of their characteristic shape. As shown, pulse 15 is substantially trapezoidal. The amplified pulses from amplifier 10 are impressed on a short-circuited variable time delay line 30 which reflects incident pulses 15. The incident and reflected pulses combine to produce two resultant pulses 16, 16' of opposite polarity. The amplitude of pulses 16 or 16' is indicated and measured by a vacuum tube voltmeter 50 connected to the junction of amplifier 10 and variable, time calibrated, delay line 30.

Figure 2:
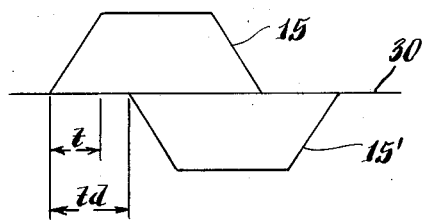
Fig. 2A shows the two pulses of opposite polarity resulting from the combining of the pulses of Fig. 2.
Figure 3:
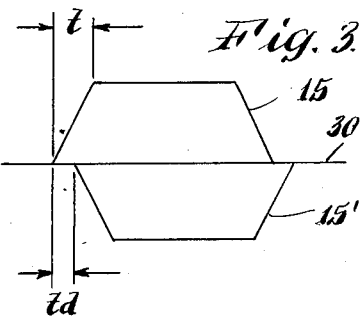
Fig. 3 is a view, similar to Fig. 2, showing conditions when the time delay of the line is less than the pulse rise time.
Figure 3A:
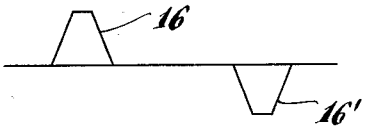
Fig. 3A shows the two resultant pulses from the combining of the pulses of Fig. 3.

The action of the apparatus will be understood from Figs. 2 through 3A, which show the pulse conditions on delay line 30 when pulse 15, whose time rise $t$ is to be measured, is impressed on line 30. Pulse 15 is transmitted along delay line 30, which is essentially an artificial transmission line, and the short circuit at the end of line 30 results in a reflected pulse 15' which travels back toward the input of line 30. Reflected pulse 15' has the same shape as incident pulse 15 but differs in polarity and arrives at the line input delayed by a time equal to the total time delay, $t_d$, of delay line 30. By total time delay is meant the time it takes incident pulse 15 to travel to the end of line 30 plus the time it takes for reflected pulse 15' to travel back to the input of line 30.

Figure 2A:
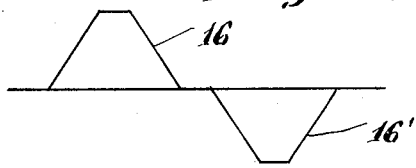

In Fig. 2, the time delay $t_d$ is greater than the pulse rise time. Consequently, the combination of pulses 15 and 15' results in the two opposite polarity pulses 16, 16' of Fig. 2A, each having an amplitude equal to that of incident pulse 15. It can be seen that, as delay time $t_d$ is varied relative to rise time $t$, there is a corresponding change in the linear relation of pulses 15 and 15'. This results in a corresponding change in the algebraic sum of pulses 15, 15', with the maximum value equal to the amplitude of pulse 15 (right above line 30). Consequently, there is a corresponding change in the amplitude of the two resultant pulses 16, 16', with the maximum value determined by the amplitude of incident pulse 15.

This will be even clearer from a consideration of Figs. 3 and 3A which show the pulse relations when delay time $t_d$ is less than rise time $t$. In this case, the algebraic sum of pulses 15 and 15' results in the two opposite polarity pulses 16 and 16' each having an amplitude less than that of incident pulse 15. Consequently, the known time delay $t_d$ is an accurate measurement of the unknown rise time $t$, and by varying $t_d$ until one of the pulses 16 or 16' has reached its peak amplitude, the rise time $t$ can be easily determined. The specific operation to accomplish this result is set forth hereinafter.

As stated, delay line 30, which is the essence of the invention apparatus, comprises a uniformly wound coil tapped at equidistant points each connected to a condenser grounded at its low side. The delay line is essentially a low-pass filter having its sections, except for the terminal sections, identical. There are, however, some distinctions between delay line 30 and a low-pass filter. Due to the construction of the delay line, adjacent coil windings between taps are mutually coupled, and the equivalent electrical effect is that each filter section resembles an M-derived filter having a negative inductance in the shunt arm. It is a known fact that such an electrical system results in an extremely linear phase characteristic, which is a vital necessity for adequate performance of the delay line.

Figure 4:
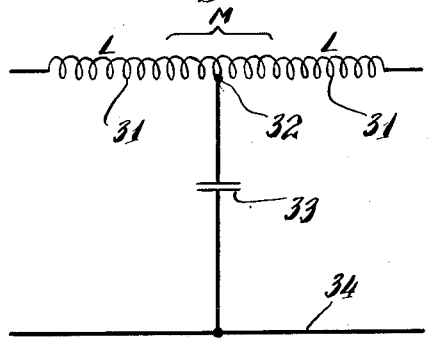
Fig. 4 is a schematic illustration of a section of the delay line.
Figure 4A:
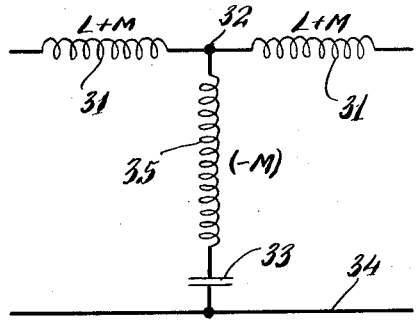
Fig. 4A is a schematic illustration of the electrical equivalent of the arrangement of Fig. 4.

The foregoing will be clear by reference to Fig. 4, showing two adjacent line sections 31, 31 whose junction point 32 is connected to one side of condenser 33. The low side of the condenser is connected to grounded line 34. Each section 31 has an inductance L and the two sections have a mutual inductance M. Fig. 4A shows the equivalent electrical circuit, in which sections 31, 31 are separated and each has an inductance L+M. Junction point 32 is connected to condenser 33 through an inductance 35 having a value of (−M). The total inductance of the circuit of Fig. 4A is equal to that of the circuit of Fig. 4, and an analysis of the circuit of Fig. 4A will yield expressions for the desired value of mutual inductance M. In turn, this yields information as to the optimum value of the ratio of coil length to coil diameter. In addition, the time delay of each section can be calculated and, as the sections are cascaded to form delay line 30, the time delay of the entire line is equal to the number of sections multiplied by the time delay of a single section.

As the calculated value of the delay time of a delay line is almost always equal to the actual value, it follows that delay line 30 can be effectively calibrated as to delay time and used to measure unknown time intervals of very short duration. In the present invention, further use is made of the fact that delay line 30, in additional to being a low-pass filter, may also be considered as an artificial transmission line and have propagation characteristics similar thereto. Thus, while the calibration of the delay time is based on the property of line 30 as a low-pass filter, its reflection characteristics are due to its artificial transmission line properties. These make possible the measurement of pulse rise time, as illustrated in Figs. 2 through 3A, by measurement of the variations in voltage amplitude of the pulses.

Video amplifier 10 has the primary function of transmitting incident pulses 15 with some degree of amplification but without change in rise time. This can be accomplished with relative ease because the required degree of amplification is small, which makes it possible to design the amplifier so that its frequency response is adequate to pass most pulses of interest. For this purpose, amplifier 10 must have a flat frequency response over the range of frequencies contained in the pulse in order not to attenuate the high frequency components and thus change the pulse rise time. Furthermore, the pulse should not be amplified too much in passing through the amplifier, or otherwise dipping may occur in one of the amplifier stages, decreasing the rise time from its original value.

The arrangement of amplifier 10 is shown schematically in Fig. 5, which also schematically indicates delay line 30 and vacuum tube voltmeter 50. Referring to Fig. 5, the incoming train of pulses is applied to the invention circuit at terminal 11 which is capacitatively coupled to the control grid 12 of a cathode follower tube or valve 13. The cathode follower insures that the high frequency response of amplifier 10 will not be adversely affected by conditions at its input.

In order to prevent limiting for large value applied pulses, a gain control is provided for the cathode follower. Such limiting would have the effect of changing part of the shape of the applied pulse before the latter reaches delay line 30, thus producing erroneous results. The gain control comprises a rheostat 14 which varies the load across the cathode-follower output. The gain control will not prevent limiting for very high value pulses, so that there is a maximum permissible pulse voltage for the apparatus.

Cathode follower 13 is capacitatively coupled to the control grid 17, a first intermediate plate amplifier 18, and amplifier 18 is in turn capacitatively coupled to the control grid 19, a second intermediate plate amplifier 20. The plate loads of amplifiers 18 and 20 are kept sufficiently low to provide adequate high frequency response, but not so low as to result in too small a gain. Amplifier tube 20 is capacitatively coupled to the control grid 21 of the last stage plate amplifier 22. The output of this plate amplifier is applied to the input of delay line 30 through capacitance 23 and junction point 24.

Delay line 30 comprises the cascaded sections 31 having the junction points or taps 32 connected to condensers 33 which are grounded as at 34. Additionally, each tap 32 is connected to a terminal 37, and these terminals are aligned for engagement by a grounded, movable contact 40. Contact 40 may be moved to engage any particular terminal 37 and thus set the short-circuited length of delay line 30 to select the time delay. In practice, line 30 may comprise two sections, one having shorter steps than the other to obtain finely graduated adjustments. Likewise, contact 40 may be driven by a reversible motor or other suitable means, such as through the medium of a screw and nut.

Voltmeter 50 is capacitatively coupled to junction point 24 so as to measure the voltages of pulses appearing on the line at this point. The voltmeter includes the usual electronic components of a vacuum tube voltmeter, feeding a network 51 across which is connected the peak voltage indicating meter 55. The voltmeter 50 should have design characteristics such that it will have a minimum error effected by the pulse repetition rate and pulse width.

In operation, the incoming train of pulses is applied to video amplifier 10, and the amplified pulses to delay line 30. The gain control 14 is adjusted for slightly less than full scale deflection on meter 55. Contact 40 of delay line 30 is then moved, in steps, from the zero delay position (left end of line 30) to increase the delay time. The reading of meter 50 will increase in steps and reach a constant value. The step at which the meter reading ceases to increase is the peak voltage of pulse 16 or 16'. The rise time of pulse 15 is then found by noting the calibrated delay time corresponding to the position of contact 40, and a calibration chart may be utilized to convert the delay time into pulse rise time if $t$ and $t_d$ do not have a unit ratio. By plotting the voltage from meter 55, against the delay time for each successive step of contact 40, the shape of the rise part of the pulse may be determined.

Although reference has previously been made to "rise" time and graphical details of the method and apparatus for measuring the same have been specified in detail, it is obvious that the same may be used to measure the decay time, which represents the "fall" of the pulse following the rise of maximum amplitude.

Although I have shown and described the application of means in circuit to amplify the pulse signal fed thereto, it is within the province of the invention, when the pulse signal is of sufficiently high magnitude and therefore "strong" to eliminate the necessity of the amplification stage.

Although I have disclosed a voltmeter as the indicator from which the peak values involved may be ascertained periodically, it is within the province of this invention to provide a graphical direct reading mechanism for plotting the time rise and decay values of input pulse.

The invention thus provides a simple and effective method and apparatus for mensuration of pulse rise and decay time. The apparatus has a wide frequency range and is comparatively simple to design, inexpensive to construct and not complicated to operate.

While a specific embodiment of the invention has been shown and described in detail to illustrate the application of the principles thereof, it should be understood that the invention may be otherwise embodied without departing from such principles.

What is claimed is:

1. A method of measuring the time rise and decay of substantially trapezoidally shaped pulses comprising reflecting an incident pulse with a variable and accurately measurable time delay to produce a reflected pulse of the same amplitude which is opposed to the incident pulse and combines therewith to form two opposed equal amplitude pulses having an amplitude which is a function of the time delay; measuring the amplitude of one of such two pulses while varying the time delay until the pulse amplitude rises to a constant value; and comparing such measurement with the calibrated value of the time delay at which such pulse amplitude has a constant value.

2. A method of measuring the time rise and decay of substantially trapezoidally-shaped pulses comprising impressing an incident pulse to be measured on a short circuited delay line having a variable calibrated time delay to produce a reflected pulse of the same amplitude which is opposed to the incident pulse and combines therewith to form two opposed equal amplitude pulses having an amplitude which is a function of the time delay; measuring the amplitude of one of such two pulses while varying the time delay until the pulse amplitude rises to a constant value; and comparing such measurement with the calibrated value of the time delay at which such pulse amplitude has a constant value.

3. A method of measuring the time rise and decay of substantially trapezoidally-shaped pulses comprising impressing an incident pulse to be measured on an adjustable length reflecting line having a variable calibrated time delay which is a function of the length of the line to produce a reflected pulse of the same amplitude which is opposed to the incident pulse and combines therewith to form two opposed equal amplitude pulses having an amplitude which is a function of the time delay; measuring the amplitude of one of such two pulses while varying the length of the line until the pulse amplitude rises to a constant value; and comparing such measurement with the calibrated value of the time delay at which such pulse amplitude has a constant value.

4. A method of measuring the time rise of substantially trapezoidally-shaped pulses comprising reflecting an incident pulse with a variable and accurately measurable time delay to produce a reflected pulse of the same amplitude which is opposed to the incident pulse and combines therewith to form two opposed equal amplitude pulses having a peak voltage which is a function of the time delay; measuring the voltage of one of such two pulses while varying the time delay until the pulse voltage rises to a constant value; and comparing such measurement with the calibrated value of the time delay at which such pulse voltage has a constant value.

5. A method of measuring the time rise and decay of substantially trapezoidally-shaped pulses comprising impressing an incident pulse to be measured on a short-circuited delay line having a variable calibrated time delay to produce a reflected pulse of the same amplitude which is opposed to the incident pulse and combines therewith to form two opposed equal amplitude pulses having a peak voltage which is a function of the time delay; measuring the voltage of one of such two pulses while varying the time delay until the pulse voltage rises to a constant value; and comparing such measurement with the calibrated value of the time delay at which such pulse voltage has a constant value.

6. A method of measuring the time rise and decay of substantially trapezoidally-shaped pulses comprising impressing an incident pulse to be measured on an adjustable length reflecting line having a variable calibrated time delay which is a function of the length of the line to produce a reflected pulse of the same amplitude which is opposed to the incident pulse and combines therewith to form two opposed equal amplitude pulses having a peak voltage which is a function of the time delay; measuring the voltage of one of such two pulses while varying the length of the line until the pulse voltage rises to a constant value; and comparing such measurement with the calibrated value of the time delay at which such pulse voltage has a constant value.

7. A method of measuring the time rise and decay of substantially trapezoidally-shaped pulses comprising amplifying a train of pulses without changing their shape; impressing the amplified pulses on an adjustable length reflecting line having a variable calibrated time delay which is a function of the length of the line to produce reflected pulses of the same amplitude opposed to the incident pulses and each combining with an incident pulse to form two pulses of opposite polarity having an amplitude which is a function of the time delay; measuring the amplitude of one of such two pulses while varying the time delay until the pulse amplitude rises to a constant value; and comparing such measurement with the calibrated value of the time delay at which such pulse amplitude has a constant value.

8. Apparatus for measuring the time rise and decay of substantially trapezoidally-shaped pulses comprising, in combination, a video amplifier operable to amplify a train of pulses without changing their shape; means for impressing a train of pulses on said video amplifier; an adjustable length reflecting line having a variable calibrated time delay which is a function of the length of the line; means connecting the output of said amplifier to the input of said line for impressing the amplified incident pulses on said line to produce reflected pulses of the same amplitude opposed to the incident pulses and each combining with an incident pulse to form two pulses of opposite polarity having an amplitude which is a function of the time delay; means for adjusting the length of said line to vary the amplitude of such two pulses; and means for measuring the amplitude of one of such two pulses; whereby the length of said line may be adjusted until the measuring means indicates a constant peak pulse amplitude which peak amplitude may be compared with the calibrated value of the adjusted time delay of said line to determine the pulse rise time.

9. Apparatus for measuring the time rise and decay of substantially trapezoidally-shaped pulses comprising, in combination, a video amplifier operable to amplify a train of pulses without changing their shape; means for impressing a train of pulses on said video amplifier; an adjustable length reflecting line having a variable calibrated time delay which is a function of the length of the line; means connecting the output of said amplifier to the input of said line for impressing the amplified incident pulses on said line to produce reflected pulses of the same amplitude opposed to the incident pulses and each combining with an incident pulse to form two pulses of opposite polarity having an amplitude which is a function of the time delay; means for adjusting the length of said line to vary the amplitude of such two pulses; and a meter electrically connected to the open end of said line for measuring the amplitude of one of such two pulses; whereby the length of said line may be adjusted until the measuring means indicates a constant peak pulse amplitude which peak amplitude may be compared with the calibrated value of the adjusted time delay of said line to determine the pulse rise time.

10. Apparatus for measuring the time rise and decay of substantially trapezoidally-shaped pulses comprising, in combination, a video amplifier operable to amplify a train of pulses without changing their shape; an adjustable length reflecting line connected to the output of said amplifier to receive amplified incident pulses therefrom and having a variable calibrated time delay which is a function of the length of the line to produce reflected pulses of the same amplitude opposed to the incident pulses and each combining with an incident pulse to form two pulses of opposite polarity having an amplitude which is a function of the time delay; means for adjusting the length of said line to vary the amplitude of such two pulses; and mensuration means connected to the junction of said amplifier and line for measuring the amplitude of one of such two pulses; whereby the length of said line may be adjusted until the measuring means indicates a constant peak pulse amplitude which peak amplitude may be compared with the calibrated value of the adjusted time delay of said line to determine the pulse rise time.

11. Apparatus for measuring the time rise and decay of substantially trapezoidally-shaped pulses comprising, in combination, a video amplifier operable to amplify a train of pulses without changing their shape; an adjustable length reflecting line connected to the output of said amplifier to receive amplified incident pulses therefrom and having a variable calibrated time delay which is a function of the length of the line to produce reflected pulses of the same amplitude opposed to the incident pulses and each combining with an incident pulse to form two pulses of opposite polarity having an amplitude which is a function of the time delay; means for adjusting the length of said line to vary the amplitude of such two pulses; and a vacuum tube voltmeter for measuring the amplitude of one of such two pulses; whereby the length of said line may be adjusted until the measuring means indicates a constant peak pulse amplitude which the peak amplitude may be compared with the calibrated value of the adjusted time delay of said line to determine the pulse rise time.

12. Apparatus for measuring the time rise and decay of substantially trapezoidally-shaped pulses comprising, in combination, a video amplifier operable to amplify a train of pulses without changing their shape, means for impressing a train of pulses on said video amplifier, an adjustable length reflecting line having a variable calibrated time delay which is a function of the length of the line; means for connecting the output of said video amplifier to the input of said line for impressing a train of incident pulses on said line to produce reflected pulses of the same amplitude opposed to the incident pulses and each combining with an incident pulse to form two pulses of opposite polarity having an amplitude which is a function of the time delay; means for adjusting the length of said line to vary the amplitude of such two pulses; and means for measuring the amplitude of one of such two pulses; whereby the length of said line may be adjusted until the measuring means indicates a constant peak pulse amplitude which peak amplitude may be compared with the calibrated value of the adjusted time delay of said line to determine the pulse rise time.

13. Apparatus for measuring the time rise and decay of substantially trapezoidally-shaped pulses comprising, in combination, a video amplifier operable to amplify a train of pulses without changing their shape, means for impressing a train of pulses on said video amplifier, an adjustable length reflecting line having a variable calibrated time delay which is a function of the length of the line; means for connecting the output of said video amplifier to the input of said line for impressing a train of incident pulses on said line to produce reflected pulses of the same amplitude opposed to the incident pulses and each combining with an incident pulse to form two pulses of opposite polarity having an amplitude which is a function of the time delay; means for adjusting the length of said line to vary the amplitude of such two pulses; and a meter electrically connected to the open end of said line for measuring the amplitude of one of such two pulses; whereby the length of said line may be adjusted until the measuring means indicates a constant peak pulse amplitude which peak amplitude may be compared with the calibrated value of the adjusted time delay of said line to determine the pulse rise time.

14. Apparatus for measuring the time rise and decay of substantially trapezoidally-shaped pulses comprising, in combination, a video amplifier operable for amplifying a train of pulses without changing their shape; means for impressing a train of pulses on said video amplifier; an adjustable length reflecting line having a variable calibrated time delay which is a function of the length of the line; means for connecting the output of said video amplifier to the input of said line for impressing a train of incident pulses on said line to produce reflected pulses of the same amplitude opposed to the incident pulses and each combining with an incident pulse to form two pulses of opposite polarity having an amplitude which is a function of the time delay; means for adjusting the length of said line to vary the amplitude of such two pulses; and means for measuring the amplitude of one of such two pulses; whereby the length of said line may be adjusted until the measuring means indicates a constant peak pulse amplitude which peak amplitude may be compared with the calibrated value of the adjusted time delay of said line to determine the pulse rise time.

15. Apparatus for measuring the time rise and decay of substantially trapezoidally-shaped pulses comprising, in combination, a video amplifier operable for amplifying a train of pulses without changing their shape; means for impressing a train of pulses on said video amplifier; pulse reflecting means connected to the output of said video amplifier for receiving incident pulses therefrom and reflecting the incident pulses with a variable and accurately measurable time delay to produce reflected pulses of the same amplitude opposed to the incident pulses and each combining with an incident pulse to form two pulses of opposite polarity having an amplitude which is a function of the time delay; means for varying the time delay; and means for measuring the amplitude of one of such two pulses while varying the time delay until the pulse amplitude rises to a constant peak value whereby the peak amplitude thereof may be compared with the calibrated value of the time delay to determine the pulse rise time.

MORTON FASSBERG.

REFERENCES CITED

The following references are of record in the file of this patent:

UNITED STATES PATENTS

| Number | Name | Date |
|---|---|---|
| 2,223,840 | Wolff | Dec. 3, 1940 |
| 2,344,745 | Somers | Mar. 21, 1944 |
| 2,444,341 | Easton | June 29, 1948 |
| 2,471,105 | Gustafsson et al. | May 24, 1949 |